United States Patent [19]

Bilhorn

[11] Patent Number: 4,736,563
[45] Date of Patent: Apr. 12, 1988

[54] GREENHOUSE CLIP

[76] Inventor: J. David Bilhorn, 652 Hwy. 73, Edgerton, Wis. 53534

[21] Appl. No.: 947,880

[22] Filed: Dec. 30, 1986

[51] Int. Cl.[4] .............................. E04C 1/34; E04D 3/14
[52] U.S. Cl. ........................................ 52/460; 52/474; 47/17
[58] Field of Search .................... 52/459–472, 52/586, 474; 47/17

[56] References Cited

U.S. PATENT DOCUMENTS

| | | | |
|---|---|---|---|
| 1,772,417 | 8/1930 | Ellinwood | 52/465 |
| 2,784,814 | 3/1957 | Bright | 52/465 |
| 2,867,028 | 1/1959 | Trost | 24/462 |
| 3,082,867 | 3/1963 | Gelpey | 206/47 |
| 3,205,547 | 9/1965 | Riekse | 24/292 |
| 3,380,210 | 4/1968 | Neal et al. | 52/235 |
| 3,858,377 | 1/1975 | Browne et al. | 52/463 |
| 3,875,623 | 4/1975 | Johnston | |
| 3,940,893 | 3/1976 | Rausch et al. | 52/586 |
| 4,067,155 | 1/1978 | Ruff et al. | 52/288 |
| 4,138,808 | 2/1979 | Walkiewicz | 52/459 |
| 4,144,622 | 3/1979 | Yoshinari | 160/392 |
| 4,188,764 | 2/1980 | Gode | 52/586 |
| 4,222,210 | 9/1980 | Hanstein et al. | 52/461 |
| 4,231,141 | 11/1980 | Derrick et al. | 160/395 |
| 4,233,790 | 11/1980 | Meadows | 52/222 |
| 4,333,284 | 6/1982 | Meadows | 52/222 |
| 4,385,850 | 5/1983 | Bobath | 403/205 |
| 4,407,100 | 10/1983 | Huelsekopf | 52/475 |
| 4,447,935 | 5/1984 | Ausnit | 160/391 |
| 4,463,534 | 8/1984 | Crigler | 52/395 |
| 4,472,862 | 9/1984 | Bloomfield et al. | 160/395 |
| 4,556,236 | 1/1986 | Pound | 52/222 |

FOREIGN PATENT DOCUMENTS 2208822 10/1973 Fed. Rep. of Germany .
1467374 12/1966 France .

OTHER PUBLICATIONS

International Publication WO 85/03408 published Aug. 15, 1985, 4 pages dwg, 17 pages spec.
Polygal Advertising Literature, namely p. 3.

Primary Examiner—James L. Ridgill, Jr.
Attorney, Agent, or Firm—Barnes & Thornburg

[57] ABSTRACT

A two-piece fastening arrangement for joining two structural greenhouse panels. The fastener is capable of connecting a wide range of thicknesses of structural panels. A cap member snaps into a base member and biases the structural panels between the cap and base. The snap engagement is between two sets of cooperative arms extending from each member, one member having hooks which are inserted into recessed areas or notches of the other member. The notched member has a plurality of notches in the arms making the fastener capable of connecting a wide range of different width panels. The cap member has a crescent shape to bias the structural panel and improve the sealing of the joint. With the crescent shape and size of the notches, different thicknesses of panels can be connected to each other with a uniform fastener.

11 Claims, 1 Drawing Sheet

GREENHOUSE CLIP

BACKGROUND AND SUMMARY

The present invention relates generally to building constructions. More particularly, this invention relates to snap-fit assemblies for retaining greenhouse structural panels.

Present day greenhouses can be constructed with a number of different coverings. For example, greenhouses have been covered with thin, flexible plastic sheeting which is often available at low cost. This plastic sheeting is typically secured to the structural support members of the greenhouse. Various clip arrangements have been employed for this purpose. Many of these clips are constructed from aluminum. However, plastic sheeting often has to be replaced since it was easily damaged by wind, rain, and normal wear and tear.

As an alternative to plastic sheeting, plate glass can be used to cover the greenhouse. In order to connect glass to the structural support members of the greenhouse, a different type of fastening system is used. This fastening system needs to securely retain the relatively heavy panels but without breaking or cracking the glass.

Since glass panels break relatively easily, plastic panels have been employed instead. Presently, a number of different types of plastic structural panels are being used on greenhouses. One particular type of plastic panel is called polycarbonate structural sheeting and is sold by Polymark of Janesville, Wis. Polycarbonate sheets have several advantages over the glass structural panels. For example, while polycarbonate sheets can use similar fastening systems as glass sheets, polycarbonate sheets are less easily broken. Also, polycarbonate sheets can provide better insulating characteristics than glass sheets in many applications.

The present invention provides novel improvements to clip-type fastening systems used to connect greenhouse structural panels together. In the greenhouse industry, translucent structural panels, such as those of glass or polycarbonate, are connected to each other and also to the supporting structure or underlying framework of the greenhouse. Prior fastening or connecting clips have also been made from polycarbonate materials. One type of polycarbonate clip is called an H-Clip Profile and is available from Polymark of Janesville, Wis. The H-Clip Profile has been used for side wall and roof constructions in greenhouses. This device is a two-piece interlocking base and cap fastening system which can incorporate many of the desirable characteristics of polycarbonate sheeting. H-Clip Profile fastener systems are typically much lower in cost than comparable fastener systems formed from aluminum. Polycarbonate clips have better light transmission and thermal insulation characteristics than aluminum clips. Further, H-Clip Profiles have no exposed fasteners to the underlying framework. Their secure, interlocking grip can create a weather-tight seal without the use of neoprene gaskets. H-Clip Profiles have considerably less weight than metal fastener systems. Thus, shipping and construction costs are reduced and, at the same time, load stress on the greenhouse support structure is decreased. However, while the H-Clip Profile has a number of advantages over the prior fastener systems, it does not provide a uniform fastening system for structural panels having significantly different thicknesses. Also, this fastener system does not provide the same thermal insulating efficiencies as the structural panels it connects.

Another polycarbonate fastener is called an H-Profile. This is a single piece device and is also available from Polymark. H-Profiles include a plurality of opposing recesses for receiving the edges of structural panels. To install the panels, this clip is slid into position from one end of each panel. With H-Clip Profiles, on the other hand, the panels are set in place on the base and the cap is subsequently snap-fit into the base. However, both of these fastener devices support and retain the structural panels between substantially flat surfaces.

Various other panel fastener systems are known which are formed from materials other than polycarbonate. It has been known, for example, to provide a two-piece clip assembly with the separate members connected together by mating projections. These projections typically have a series of mutually interlocking teeth thereon to permit the separate members to be secured at selected distances to accommodate a particular panel thickness. However, without the use of additional clip assembly elements, these devices are not known to secure two panels together which each have a different thickness.

Other two-piece clip assemblies are known to have some flexibility in the cap member so as to bias the panels toward the base member. However, these typically secure the panels over a broad surface rather than at discrete points. Also, such devices often require compressible gaskets to provide proper sealing.

Therefore, it is an object of this invention to provide an improved fastening system.

It is another object of this invention to provide a fastening system that can accommodate a wide range of thicknesses of structural panels while using a uniform cap and a uniform base member.

A further object is to provide a fastening system that does not significantly restrict the transmission of light into the greenhouse.

Still another object is to provide a fastening system that has the same thermal characteristics as the structural panels being held.

Yet another object is to provide a fastening system with a base member that can be attached to a support purlin by various fasteners through the longitudinal center axis of the base member without effecting the fastening means of the system.

Yet still another object is to provide a clip arrangement that is self sealing to water and air.

A still further object is to provide a two-piece clip assembly for securing two panels each having a different thickness.

These and other objects of the present invention are attained by the provision of a fastener system having two mutually interlocking clip members, each clip member including a connection element and a pair of panel retaining walls. The connection element of one clip member is received and retained by the connection element of the other clip member through a series of interlocking hooks. The panel retaining walls of the cap clip member are flexibly arched and each includes a plurality of discrete panel engaging projections. The base clip member receives each panel on its retaining walls and can locate the panel ends against the connection element. The panel retaining walls of the cap clip member are independently flexible to permit each panel to have a different thickness. The discrete panel engaging projections are biased by the arch of the retaining walls to ensure proper sealing and secure panel retention.

The connection elements of the present invention are specially adapted to assist in retaining two panels, each having a different thickness. Each connection element includes spaced-apart arms having interlocking hooks formed thereon. Each hook arm of one connection element cooperates with a hook arm of the other connection element to act as a panel locking set. Within each such set at least one arm includes a plurality of spaced hooks such that different vertical spacing between clip members can be secured. Each locking set is operationally associated with the clip member retaining walls for a given panel and can be adjusted independently of the other locking set to establish different spacing for its retaining walls resulting in different thicknesses of panels being secured.

The components of the present invention are preferably formed from light transmitting materials, such as translucent polycarbonate. At the same time, additional barriers can be provided in the connection members to improve thermal insulation. Also, each set of spaced apart arms are spaced apart sufficiently to allow fasteners to be disposed within the connection member to secure the fastener system to the underlying support structure.

Other objects, advantages and novel features of the present invention will now become readily apparent upon consideration of the following description of preferred embodiments in conjunction with the drawings.

DETAILED DESCRIPTION OF THE PREFERRED EMBODIMENTS

Figure 1:
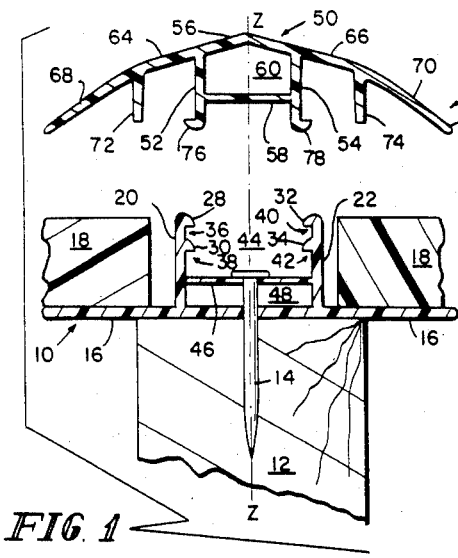
FIG. 1 shows a cross-sectional view of a fastening system embodying the present invention prior to assembly.

FIG. 1 illustrates a preferred embodiment of the present invention. A base member 10 is shown secured to a structural supporting member or purlin 12 by fastener 14. Base member 10 has outwardly extending bottom walls 16 for supporting and locating structural panels 18. Two spaced-apart arms 20 and 22, extend upwardly from walls 16, substantially parallel to axis Z—Z, and preferably continue the longitudinal length x—x of the bottom walls. Arms 20 and 22 are, for example, spaced an equal distance from each other over their entire lengths. Arms 20 and 22 can also serve as a stop to locate panels 18 in position prior to engagement of cap 26 into the base 10. Arms 20 and 22 are preferably integrally formed with bottom walls 16 and made of a resilient material having sufficient flexibility and resiliency to allow engagement with the arms of cap 26 as described below, and yet have sufficient strength to hold cap portion 26 in position as the cap and base clamp the panels 18 in position.

Arms 20 and 22 include hooks 28 and 30, and 32 and 34 respectively, extending inwardly from the arms towards the axis Z—Z of FIG. 1. These hooks form notches 36 and 38 and 40 and 42 which face inwardly towards axis Z—Z. Two sets of notches are show in the drawing, for illustrative purposes, although additional sets of notches are contemplated. The number and spacing of the sets of notches correspond generally to the thickness of the panels to be connected by the particular fastening apparatus. Arms 20 and 22 form a recess 44 between them. Recess 44 has sufficient width to allow fastener 12 to be disposed within, in order to attach base member 10 to support 12. Recess 44 is spaced apart from wall 24 by an inner wall 46 extending from one arm 20 to the other arm 22 preferably over the longitudinal length of the base. This inner wall 46 extends, for example, substantially parallel to wall 20 and is spaced from wall 20 to form a dead air space 48 which helps to provide the base with better thermal insulating characteristics.

The fastening system of this invention also includes cap 26 having a reinforced middle section 50 with arms 52 and 54 extending outwardly from wall 56. Arms 52 and 54 are preferably substantially parallel to the Z axis of FIG. 1, and wall 56 is, for example, arched or crescent-shaped in cross section. Arms 52 and 54 are preferably integrally formed with wall 56. Arms 52 and 54 cooperate with arms 20 and 22 of base 10 to provide the panel locking means of the fastening system. Arms 52 and 54 extend, for example, along the longitudinal length of cap 26. An inner wall 58 is provided which is spaced apart from surface 56 of cap 26 to form another dead air space 60. As with wall 46, inner wall 58 preferably extends the longitudinal length of cap 26.

Figure 3:
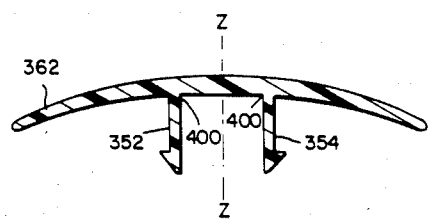
FIG. 3 is a cross-sectional view of a cap member of an alternative embodiment of the present invention.

Composite wall 62 includes a first set of cantilevered and flexible arms 64 and 66 attached to reinforced base section 50 on one side. Attached to the other side is a second set of cantilevered and flexible arms 68 and 70 extending outwardly with the first set of arms. Arms 64, 66, 68, and 70 attach together with wall 56 to form a crescent-shaped or arched cross-section of the outer composite wall 62 ofo cap 26. Wall 62 has a third set of intermediate arms 72 and 74 extending outwardly from the connection of arms 64 and 68 and 66 and 70, respectively, typically extending the length of the cap parallel to each other. These arms are preferably substantially parallel to arms 52 and 54 when the cap is not engaged in base 10. Intermediate arms 72 and 74 provide additional contact or interface surfaces to further retain a structural panels 18 between the cap 26 and the base 10 when the cap is secured in the base. Intermediate arms 72 and 74 also provide additional strength to wall 62. In alternative embodiments, these intermediate arms can be constructed of various configurations or left out entirely as seen in FIG. 3 depending on the desired biasing forces or thickness of the structural panels to be fastened.

Arms 52 and 54 of the cap 26 are provided with hooks 76 and 78 protruding outwardly away from axis Z—Z and from the arms. These interlocking hooks are made to cooperate with hooks 28, 30, 32 and 34 of base 10. Inclined surfaces on hooks 28, 30, 32, 34, 76 and 78 help ease the insertion of cap 26 into base 10. The surface of the hooks 76 and 78 act as inclined planes pushing the arms 20 and 22 of the base outwardly and the arms 52 and 54 of the cap in as both can resiliently flex during insertion of the cap member. After sliding past hooks 28 and 32, hooks 76 and 78 of the cap are inserted within recessed portions or notches 36 and 40 of the base and, thereupon, the arms 52 and 54 spring back into position to hold cap and base together.

If there is insufficient holding force of the structural panels at this stage of insertion, cap 26 is forced further into base 20. Hooks 76 and 78 again force arms 20 and 22 outwardly and arms 52 and 54 inwardly as hooks 76 and 78 are pushed past hooks 30 and 34 of base 10 into recessed areas 38 and 40. This position is typically used when panels of smaller thickness are connected.

Figure 2:
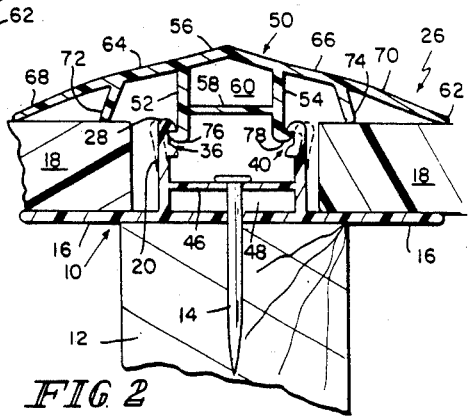
FIG. 2 shows a cross-sectional view of the fastening system of FIG. 1 after assembly.

As illustrated in FIG. 1 and FIG. 2, when connecting panels of similar thickness, depending on the thickness of the panel to be secured, the hooks 76, 78 are engaged in recessed areas 36 and 40 or 38 and 42. Three pairs of cantilevered and flexible arms 64 and 66, 68 and 70, 72 and 74 provide the biasing forces.

The clip arrangement of this invention can hold differently sized structural panels together. For example, both 6 mm and 7 mm panels are connectable as the hooks 76 and 78 are, for example, connected within the notches 38 and 42 respectively. The 7 mm panels are typically held somewhat tighter than the 6 mm panels, yet both panels are adequately secured in place. The crescent shape and flexible characteristics of the polycarbonate material of wall 62 are believed to allow this biasing force to hold both sizes. When 10 mm and 12 mm sheets are to be connected, hooks 76 and 78 are, for example, held within notches 36 and 40, respectively.

Figure 4:
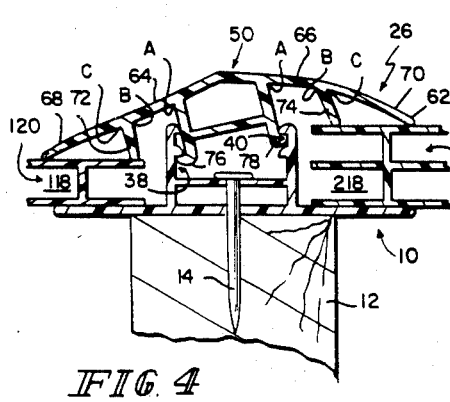
FIG. 4 shows a cross-sectional view of the fastening system of FIG. 1 clamping two panels each of different thicknesses.
Figure 5:
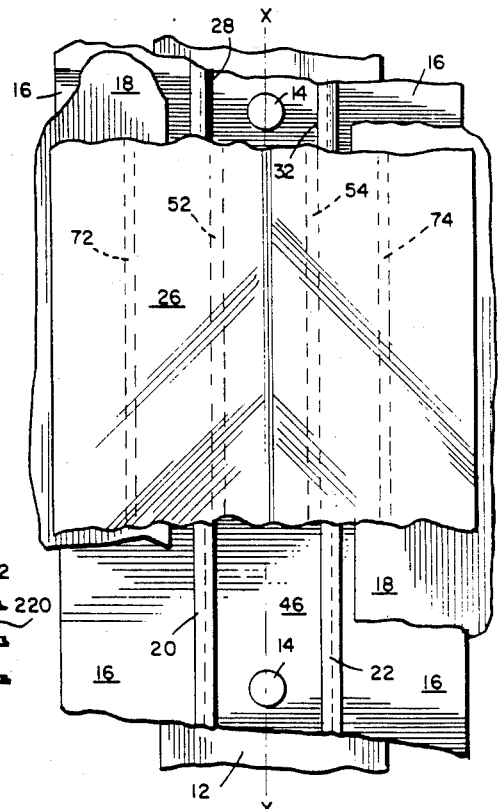
FIG. 5 is a top plan view with portions broken away of the fastening system of FIG. 1.

In addition, as seen in FIG. 4, recessed portions 36, 38, 40 and 42 have sufficient depth to allow cap member 26 to be cocked in base 10 and still be securely engaged. As illustrated, hooks 76 and 78 can be engaged in recessed areas 38 and 40. In this position, a structural panel 118 relatively of small thickness can be connected to a structural panel 218 of relatively large thickness. Crescent shaped wall 62 provides biasing force to secure this type of connecting. This is believed to be possible because such of the three sets of arms 68 and 70, 64 and 66, 72 and 74 interact to provide resilient forces against the surfaces of panels 18 by way of resilient hinge joints A, B, and C.

Thus, it can be seen walls 16 and 62 form snap-fit panel receiving chambers between each other with an intermediate chamber formed by walls 28, 32, 52, and 54. This intermediate chamber includes two dead air insulating layers and an independent variable interlocking arrangement. The dead air layers serve a similar function as dead air layers 120 and 220 in the panels. At the same time, the walls defining the intermediate chamber provide positive location for the panels.

The clip arrangement is self-sealing at the end of wall 62 at arms 68 and 70 and at the end of arms 72 and 74 to provide a double seal. When the base, cap, and panel are made of the same material, preferably polycarbonate, there is typically no significant difference in the coefficient of thermal expansion between the components despite changes in environmental temperature. The resilient nature of the material also contributes to the sealing effect of the clip.

As seen in FIG. 3, the cap 26 can alternatively be constructed without wall 58 and arms 72 and 74. With this embodiment, arms 352 and 354 are forced outwardly away from axis Z—Z when arched wall 362 is flattened by engagement with a panel. This results in arms 352 and 354 being forced tightly within corresponding notches. The cap is hinged at joints 400 during this movement.

The translucent fastening system of the present invention provides for light to be transmitted into the building through the fastening system as well as the panels.

Some embodiments can use a cap member made from polycarbonate or another plastic material with the base member of aluminum. Other preferred embodiments include the base member formed integrally with the structural supporting member 12. In particular, where the structural member would restrict light transmission an integrally formed arrangement of aluminum could be used. The base would have a positive connection to the structural member and simplify construction of the building.

Although the present invention has been described in detail, the same is by way of illustration and example only and is not to be taken by way of limitation. The spirit and scope of the present invention are to be limited only by the terms of the appended claims.

What is claimed is:

1. A two-piece fastening arrangement of interlocking clip members comprising:

a base having spaced-apart arms with a plurality of interlocking hooks thereby forming notched, and a cap having a reinforced inner portion thereby forming an integrally formed insulation means, said cap further including two first cantilevered and flexible arms extending from the inner portion, two second cantilevered and flexible arms extending from the first arms, and two third intermediate flexible arms connected to an area where said first and second arms connect, said reinforced inner portion of the cap having interlocking hooks engageable with the notches of the base, said three sets of flexible arms of said cap providing biasing means.

2. The arrangement of claim 1 wherein said cap is formed of polycarbonate material.

3. The arrangement of claim 1 wherein said cap is translucent.

4. The two-piece fastening arrangement of claim 1 wherein said spaced-apart arms of said base have sufficient width to allow a fastening element to be inserted between said arms thereby attaching said base to a support member.

5. The two-piece fastening arrangement of claim 1 wherein said base and said cap both include integrally formed insulation means within said spaced arms of said base and said inner portion of said cap.

6. A two-piece assembly, for fixedly retaining a plurality of exterior wall panels to a support structure, comprising:

a base member having a plurality of panel engaging elements;

a cap member having a plurality of panel engaging elements;

said cap and base members each including connection means for fastening said cap and base members together to form a plurality of panel engaging recesses between said panel engaging elements;

an intermediate chamber between said panel engaging recesses;

said intermediate chamber including therein said connection means, a plurality of insulating chambers, and an attachment means for retaining said assembly to said support structure;

said cap member having a flexible arch cross-sectional configuration for providing biasing force to said panels through said engaging elements;

said engaging elements each including a plurality of contact projection means for sealing engagement with each of said panels;

said connection means including a first and a second set of mateable arms;

each of said sets of mateable arms including a first and a second arm, at least one of said first and second arms having a plurality of notches thereon with the other of said first and second arms having a hook element interlockable with at least one of said notches;

said first and second sets of mateable arms being spaced apart and corresponding with at least one of said panel engaging recesses so as to provide a locating stop for a panel inserted in that recess; and said first and second arms of said first set of mateable arms being independently interlocked with respect to said first and second arms of said second set of mateable arms according to the thickness of the panel insert in said corresponding recess and said biasing force of said cap member, whereby said wall panels of different thicknesses can be connected to one another.

7. The two-piece assembly according to claim 6 wherein said cap and base members are formed from translucent polycarbonate material.

8. A fastening arrangement for attaching structural panels of both similar and different thicknesses comprising:
- at least two structural panels;
- at least one cap element;
- at least one base element;
- connection means for holding said cap within said base;
- said cap having spaced-apart arms for engagement into said base and panel engaging arms for biasing said structural panels;
- said base having spaced-apart arms cooperating with said spaced-apart arms of said cap to cooperate as said connection means;
- said panel engaging arms of said cap providing a double seal on said structural panels and biasing force from a cresent shape configuration of the cap;
- said biasing force increasing as said cap is moved further within said base at the connection means.

9. The arrangement of claim 8 wherein said cap includes integrally formed insulation means between said connection means.

10. The arrangement of claim 8 wherein said base includes integrally formed insulation means between said connection means.

11. The arrangement of claim 8 wherein said base and said cap are formed of polycarbonate material.

* * * * *